United States Patent [19]

Crowhurst

[11] 4,273,318

[45] Jun. 16, 1981

[54] FOOD PREPARATION APPLIANCES

[76] Inventor: Brian H. Crowhurst, 2/19 Liam Pl., Howick, Auckland, New Zealand

[21] Appl. No.: 134,273

[22] Filed: Mar. 26, 1980

[30] Foreign Application Priority Data

Mar. 4, 1979 [NZ] New Zealand .......................... 190098

[51] Int. Cl.$^3$ ............................................... B23Q 3/00
[52] U.S. Cl. .................................. 269/13; 269/289 R; 269/302.1; 269/276; 141/98; 141/331
[58] Field of Search ............ 269/13, 15, 289 R, 302.1, 269/276; 141/98, 331

[56] References Cited

U.S. PATENT DOCUMENTS

| 117,723 | 8/1871 | Baker | 141/98 |
| D. 248,078 | 6/1978 | Warnekros | 141/98 X |
| 1,039,574 | 9/1912 | Morrill | 141/98 |

FOREIGN PATENT DOCUMENTS

| 283847 | 10/1952 | Switzerland | 269/276 |
| 1299596 | 12/1972 | United Kingdom | 269/302.1 |

Primary Examiner—Robert C. Watson
Attorney, Agent, or Firm—Holman & Stern

[57] ABSTRACT

A food preparation appliance is provided which comprises a tray attachable by, for example, a magnetic link to a chopping board. The combination thus allows food particles to be chopped, collected and dispensed.

8 Claims, 4 Drawing Figures

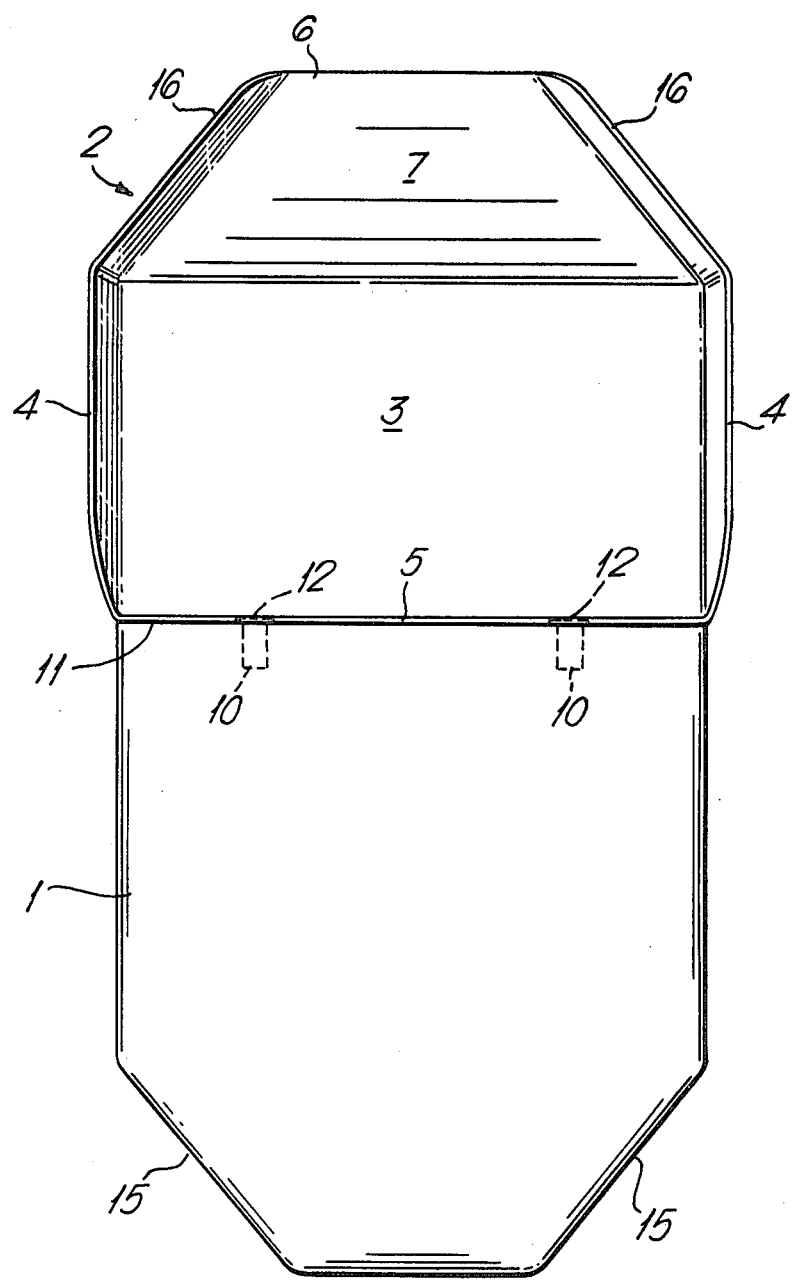

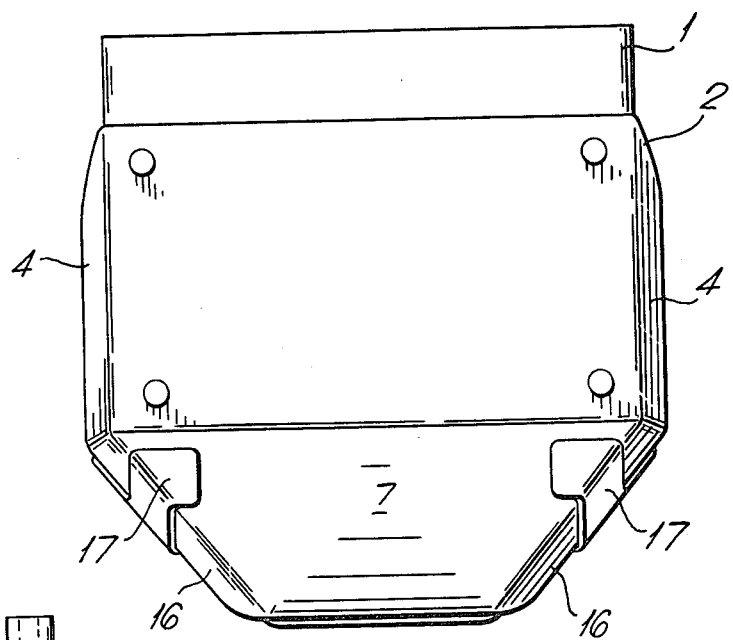
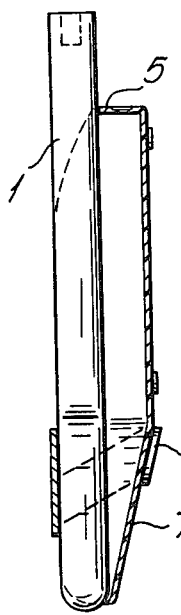
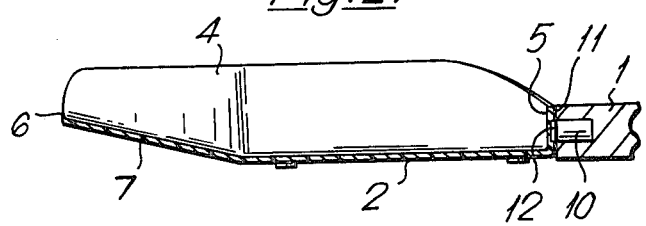

FOOD PREPARATION APPLIANCES

BACKGROUND OF THE INVENTION

Field of the Invention

This invention relates to food preparation appliances.

It is an object of the present invention to provide a food preparation appliance which will at least provide the public with a useful choice.

Accordingly the invention consists in a food preparation appliance including an attachment for a food chopping board, said attachment comprising a tray having an end wall of a height not greater than the thickness of a chopping board with which the tray is to be used; attaching means or part thereof on said end wall whereby said tray is attachable to a food chopping board, side walls and an opening opposite said end wall whereby food chopped on said chopping board and delivered to said tray may in turn be delivered through said opening to, for example, a cooking utensil or serving dish.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention and modifications thereof will now be described with reference to the accompanying drawings in which:

FIG. 1 is a plan view of an appliance according to the invention;

FIG. 2 is a part cross section of FIG. 1;

FIG. 3 is a cross section of the two parts of the invention nested together for storage; and FIG. 4 is an elevational view of the two parts of the invention nested together for storage and showing part of a bracket used to hold the two parts in the nested configuration.

Referring to the drawings in the preferred form of the invention a food preparation appliance is constructed as follows.

A chopping board 1 on which food is chopped by the use of a knife or other cutting tool is provided which is made from a suitable material, for example, wood although chopping boards made from other materials would be equally applicable. Associated with the chopping board is a tray 2 comprising a base 3, an end wall 5 and two side walls 4, the two side walls 4 coverging towards an opening 6 at the end of the base opposite to the end wall so that the sides of the tray form a sloping chute 7 which, in use, directs chopped articles deposited on the base 3 towards the opening 6.

As shown, the end wall 5 constitutes the longest side of the tray 2 and, as can be seen in FIG. 2, is of a height no greater than the thickness of the chopping board so that when the chopping board and tray are associated and placed on a plane surface the upper edge of the end wall 5 lies just below the chopping surface and hence chopped articles may be swept directly off the board and into the tray.

The side walls 4 extend above the end wall 5 and are curved gently down towards the end wall to avoid any injury to the user should the user's hands come into contact with the side walls 4 during the act of sweeping the chopped articles into the tray. It will further be appreciated, from FIGS. 1 and 4 that the side walls flare out slightly from the base 3 of the tray and this feature allows a plurality of the trays to be stacked together.

The base 3, as shown in FIGS. 2 and 3, slopes at 7 to the opening 6 so that in use, with the tray lying on a horizontal surface any juices forming part of or eminating from the chopped articles will not spill from the tray. The sloping base also ensures that the chopped articles themselves are concentrated toward the bottom of the tray, thus minimising the possibility of spillage.

Retaining or connecting means are provided as between the end wall of the tray and the chopping board, preferably an end or side wall of the chopping board. This connecting means may comprise two apertures in the end of the chopping board, each aperture having towards the inner or blind end thereof a groove forming part of the connecting means. The apertures may be provided as the internal walls of plastics inserts, the inserts in turn being inserted into drilled holes in the wooden chopping board.

In this embodiment, a corresponding pair of pins are provided on the end wall of the tray, the pins having towards their free ends a rib which in use removably and preferably resiliently engages with the groove in the internal wall of the apertures fitted in the tray or chopping board. Again the pins are preferably made of a plastic material and preferably the tray itself and the pins are integrally made as an injection moulding from a suitable plastics material, for example, polyvinylchloride or a nylon material (polyamide material).

In the embodiment shown in the accompanying drawings the connecting means comprises a magnetic link, which link comprises at least one and more preferably two magnets 10 fixed in holes in the end 11 of the chopping board 1 and ferro magnetic plates 12 embedded in the material of the end wall 5 of the tray 2.

The magnets 10 are preferably round in cross section, which simplifies the form of the receiving apertures in the chopping board and are preferably mounted in apertures in the end 11 of the chopping board along the horizontal centerline of the end 11 and symmetrically about the vertical centerline thereof. With the ferro magnetic plates positioned on the end wall 5 of the tray 2 to suit the placement of the magnets when the board and tray are mounted on a horizontal surface, the symmetrical placement of the magnets 10 enables the chopping board to be inverted while still enabling association with the tray in the inverted configuration. Thus the combination allows for two chopping surfaces to be combined with the one tray.

The above described arrangement of magnets 10 and co-acting ferromagnetic plates 12 additionally allows limited movement between the chopping board 1 and the tray 2 in directions parallel to the plane of the end wall 5 while still maintaining association between the two components. This allows each component to find its own level when the device is placed on non-planar or irregular surfaces such as, for example, counter-tops which include gentle contouring for drainage purposes. In such instances the magnets 10 and plates 12 are not necessarily prefectly aligned but are aligned to an extent necessary to maintain association between the components 1 and 2.

The use of the appliance will be clear from the foregoing. A user assembles the tray 2 on the chopping board 1 by placing the magnets 10 in contact with the plates 12 and the tray is thus held in position with its end wall close to the chopping board. If desired the chopping board may have a slight overhang or flange (not shown) and the end wall of the tray underlies that overhang. The chopping board is used in the usual way to chop up say vegetables and by a sweep of the knife the chopped material may be swept into the base 3 of the tray. This continues until chopping is completed or the tray is full and the tray may then be emptied into a cooking utensil or serving dish by upending either the combined chopping board and tray or preferably by detaching the tray from the chopping board and upending it over the utensil or dish so that the chopped contents of the tray may be passed through the opening 6 of the tray into the utensil.

The corners 15 of the chopping board are shaped to the sloping sides 16 of the tray 2 so that the tray 2 can be inverted over part of the chopping board as in FIG. 3 and the two parts of the appliance supported on a bracket 17 fixed to e.g. a wall or the inside surface of a cupboard door.

It will further be appreciated that a number of like trays may be combined with the one chopping board and thus one item can be chopped, the tray removed, and a further tray attached to receive a further item after chopping. This feature will have particular attraction to the proprietors of commercial food-preparation ventures as the food items, once chopped can be stored in the trays, the trays being arranged side by side on a shelf. The individual ingredients for any one application may then be removed as desired.

What is claimed is:

1. A food preparation appliance comprising a tray, a chopping board and means for detachably connecting said tray to said chopping board, said tray having an end wall of a height no greater than the thickness of said chopping board, a base, side walls and an opening opposite said end wall, said detachable connecting means permitting association to be maintained between said chopping board and said tray while further permitting limited displacement between said chopping board and said tray in directions substantially parallel to the plane of said end wall.

2. A food preparation appliance as claimed in claim 1 wherein said detachable connecting means comprises a magnetic link between said chopping board and said tray.

3. A food preparation appliance as claimed in claim 2 wherein said magnetic link comprises a pair of magnets on an edge of said chopping board and coacting ferro magnetic plates on the end wall of said tray.

4. A food preparation device as claimed in claim 3 wherein the magnets are positioned symmetrically about the central axes of said edge.

5. A food preparation appliance as claimed in claim 1, wherein the base of said tray is constructed and arranged so that when said tray is resting on a horizontal plane surface, said opening is above said surface and said base.

6. A food preparation appliance as claimed in claim 1 wherein said side walls taper outwardly from the base of said tray.

7. A food preparation appliance as claimed in claim 1, wherein said chopping board and said tray are shaped so that said chopping board is at least partly receivable in said tray for storage purposes.

8. A food preparation appliance as claimed in claim 1, wherein said opening in said tray is narrower in width than said end wall.

* * * * *

UNITED STATES PATENT AND TRADEMARK OFFICE
CERTIFICATE OF CORRECTION

PATENT NO. : 4,273,318
DATED : June 16, 1981
INVENTOR(S) : BRIAN HARRY CRAWHURST It is certified that error appears in the above-identified patent and that said Letters Patent are hereby corrected as shown below:

[30] Priority Data

"March 4, 1979" should be
--April 3, 1979--

Signed and Sealed this

Twenty-fifth Day of August 1981

[SEAL]

Attest:

GERALD J. MOSSINGHOFF

Attesting Officer

Commissioner of Patents and Trademarks